US008770850B2

(12) United States Patent
Ciulla

(10) Patent No.: US 8,770,850 B2
(45) Date of Patent: *Jul. 8, 2014

(54) ASYMMETRIC WHEEL HUB ASSEMBLY

(75) Inventor: Luca Ciulla, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 376 days.

This patent is subject to a terminal disclaimer.

(21) Appl. No.: 13/090,684

(22) Filed: Apr. 20, 2011

(65) Prior Publication Data

US 2011/0254355 A1    Oct. 20, 2011

(30) Foreign Application Priority Data

Apr. 20, 2010    (IT) .......................... TO2010A000329

(51) Int. Cl.
*F16C 33/58* (2006.01)
*F16C 13/00* (2006.01)

(52) U.S. Cl.
USPC ............................ 384/513; 384/516; 384/544

(58) Field of Classification Search
USPC ........................ 384/450, 513, 516, 544, 589
See application file for complete search history.

(56) References Cited

U.S. PATENT DOCUMENTS

| 7,104,695 B2* | 9/2006 | Shevket | 384/450 |
| 7,465,102 B2* | 12/2008 | Niebling et al. | 384/544 |
| 7,547,147 B2* | 6/2009 | Niebling et al. | 384/544 |
| 7,832,942 B2* | 11/2010 | Komori et al. | 384/544 |
| 7,862,242 B2* | 1/2011 | Ohtsuki | 384/544 |
| 8,007,182 B2* | 8/2011 | Mock et al. | 384/544 |
| 2005/0111771 A1 | 5/2005 | Shevket | |
| 2009/0052823 A1 | 2/2009 | Komori et al. | |
| 2009/0232435 A1 | 9/2009 | Ohtsuki | |
| 2011/0254352 A1* | 10/2011 | Ciulla | 301/109 |
| 2011/0254353 A1* | 10/2011 | Ciulla | 301/109 |
| 2011/0254354 A1* | 10/2011 | Ciulla | 301/109 |

FOREIGN PATENT DOCUMENTS

| EP | 1722115 A2 | 11/2006 |
| WO | WO2005008085 A1 | 1/2005 |

* cited by examiner

*Primary Examiner* — Marcus Charles
*Assistant Examiner* — Adam D Rogers
(74) *Attorney, Agent, or Firm* — Bryan Peckjian; SKF USA Inc. Patent Department

(57) ABSTRACT

An asymmetric wheel hub assembly with two rows of rolling elements of different pitch diameters has a central axis of rotation and inner raceway and outer raceways for each row of elements, the associated inner and outer raceways being axially displaced in accordance with a respective angle of contact and along a respective load line such that the assembly is capable of accommodating combined loading. The raceways of each row of rolling elements have osculation ratios which are defined by the ratio between the radius of curvature of the raceways and the outside diameters of the rolling elements of the associated row of rolling elements. The angle of contact and the osculation ratios of a first one of the two rows of the rolling elements is different than the angle of contact and osculation ratios of a second one of the two rows of the rolling elements.

16 Claims, 2 Drawing Sheets

ASYMMETRIC WHEEL HUB ASSEMBLY

CROSS REFERENCE

This application claims priority to Italian Patent Application No. TO2010A000329 filed on Apr. 20, 2010, the contents of which are incorporated fully herein by reference.

BACKGROUND OF THE INVENTION

The present invention relates to bearings, and more particularly to asymmetric wheel hub assemblies.

Asymmetric wheel hub assemblies are known and generally type have an axis of rotation and comprise two rows of rolling bodies with pitch diameters of dimensions that differ from one another, an inner flanged ring and an outer ring arranged coaxially with and externally to the inner ring and, for each row of rolling bodies, an inner raceway and an outer raceway obtained, respectively, on the outside of the inner ring and on the inside of the outer ring in positions axially staggered with respect to one another to permit the asymmetric wheel hub assembly to support combined loads, i.e. loads that act simultaneously in a radial direction and in an axial direction.

With asymmetric wheel hub assemblies of the type described above, the dimension of the pitch diameter of the row of rolling bodies arranged closest to a flange of the inner flanged ring, i.e. of the row of rolling bodies arranged on the so-called "outboard" side, is greater than the dimension of a diameter of the other row of rolling bodies, i.e. of the row of rolling bodies arranged on the so-called "inboard" side. The geometry just described confers greater rigidity on the asymmetric wheel hub assembly, especially if compared with a symmetrical wheel hub assembly in which both pitch diameters are identical and their dimensions are the same as the dimensions of the row of rolling bodies on the "inboard" side.

Asymmetric wheel hub assemblies are used in countless applications in the automobile field, but because of the increasingly restrictive anti-pollution regulations that have come into effect in recent years, it has been necessary to study technological solutions aimed, even indirectly, at reducing both the energy consumption of the vehicles and emissions noxious for the environment such as, for example, carbon monoxide emissions.

SUMMARY OF THE INVENTION

An object of the present invention is to provide an asymmetric wheel hub assembly which maintains high mechanical characteristics and high rigidity, as well as high reliability, while permitting a significant reduction of fuel consumption and of pollutant emissions.

According to the present invention, there is provided an asymmetric wheel hub assembly with two rows of rolling elements of different pitch diameters and an axis of rotation. The wheel hub assembly comprises, for each row of rolling elements, an inner raceway and an outer raceway which are axially displaced in accordance with a respective angle of contact and along a respective load line in order to allow the assembly to accommodate combined loading (e.g., axial and radial), the raceways of each row of rolling elements having respective osculation ratios which are defined by the ratio between the radii of curvature of the raceways and the outside diameters of the rolling elements of the associated row of rolling elements; the wheel hub assembly being characterized in that the dimensions of the angle of contact and of the osculation ratios of a first row of rolling elements of the two rows of rolling elements are different from the dimensions of the angle of contact and, respectively, of the osculation ratios of a second row of rolling elements of the two rows of rolling elements.

BRIEF DESCRIPTION OF THE SEVERAL VIEWS OF THE DRAWINGS

The invention will now be described with reference to the attached drawings which illustrate a few non-limitative exemplary embodiments, in which.

DETAILED DESCRIPTION OF THE INVENTION

Figure 1:
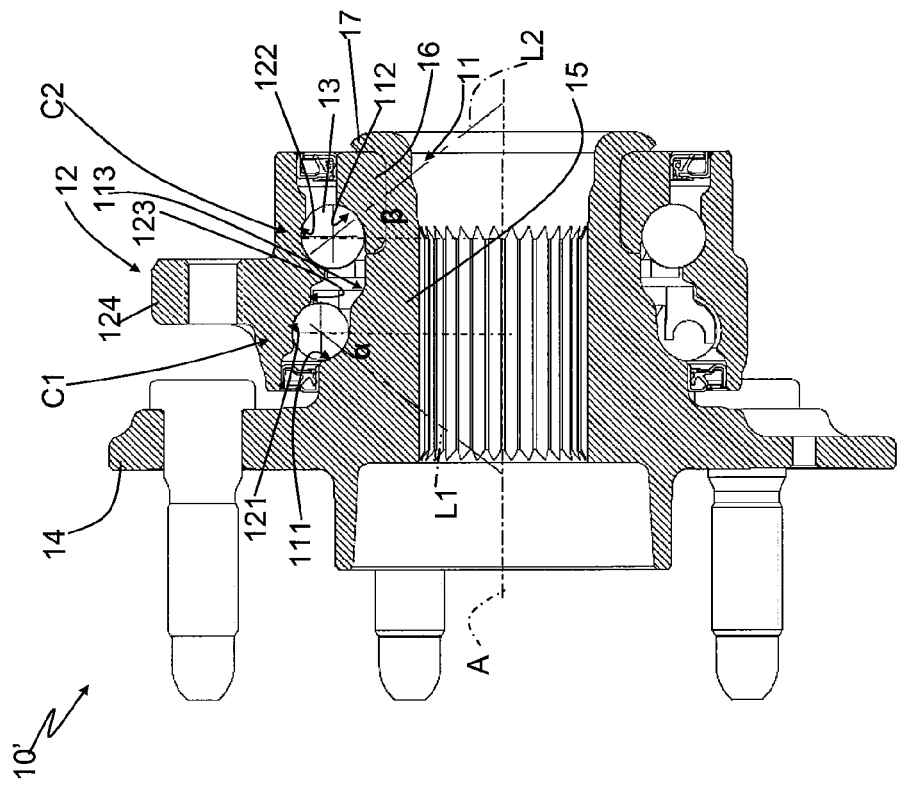
FIG. 1 illustrates, in cross section, a first preferred embodiment of a wheel hub assembly with two rows of rolling elements according to the present invention.

With reference to FIG. 1, an asymmetric wheel hub assembly 10 in accordance with the present invention has an axis A of rotation and preferably includes an inner ring 11 generally centered about the axis A, an outer ring 12 disposed coaxially about the inner ring 11, and two rows C1, C2 of rolling elements 13 disposed between the rings 11, 12. The two rings 11, 12 are angularly displaceable relative to each other due to the two rows C1, C2 of rolling elements 13. In the example described herein, the rolling elements 13 are balls, the centers of which are arranged along respective pitch diameters P1, P2, but could alternatively be any other appropriate type of bearing roller elements. In the exemplary embodiment illustrated in the Figures, the pitch diameter P1 of the first row C1 of rolling elements 13 is greater than the value of the pitch diameter P2 of the second row C2 of rolling elements 13.

More specifically, the wheel hub assembly 10 basically comprises first and second inner raceways 111, 112 disposed about the central axis of rotation A, the first row C1 of rolling elements 13 being disposed on the first inner raceway 111 and the second row C2 of rolling elements 13 disposed on the second inner raceway 112, a first outer raceway 121 disposed generally about spaced from the first inner raceway 111 and a second outer raceway 122 disposed generally about the second inner raceway 112. The first outer raceway 112 is axially spaced from the first inner raceway such that a first load line L1 through the first row C1 of rolling elements 13 defines a first angle α of contact with respect to the central axis A. Further, the second outer raceway 122 is axially spaced from the second inner raceway 112 such that a second load line L2 through the second row C2 of rolling elements 13 defines a second angle β of contact with respect to the central axis A. The load lines L1, L2 join the points of contact between the balls 13 of each row C1, C2 with the associated inner rows 111, 112 and the associated outer raceways 121, 122, and form the respective angles α and β of contact with lines perpendicular to the axis A on a radial plane. With the above structure, the assembly 10 is capable of accommodating combined loads, i.e., loading which acts simultaneously in the radial direction and in the axial direction, which are transmitted between balls 13 and inner raceways 111, 112 and between balls 13 and outer raceways 121, 122 along respective load lines L1, L2.

Further, each of the first and second inner raceways 111, 112 and each of the first and second outer raceways 121, 122 have a radius of curvature, each rolling element 13 of the first row C1 has a first outside diameter Φ1, and each rolling element 13 of the second row C2 has a second outside diameter Φ2. As such, the first row C1 of rolling elements 13 has an osculation ratio $O_{OE}$ defined between the radius of curvature of the first outer raceway 121 and the first outside diameter Φ1 and another osculation ratio $O_{OI}$ defined between radius of curvature of the first inner raceway 111 and the first outside diameter Φ1. Also, the second row C2 of rolling elements 13 has an osculation ratio $O_{IE}$ defined between radius of curvature of the second outer raceway 122 and the second rolling element outside diameter Φ2 and another osculation ratio $O_{II}$ defined between the radius of curvature of the second inner raceway 112 and the second outside diameter Φ2. Preferably, wheel hub assembly 10 is constructed such that the first angle α of contact has a value different than a value of the second angle β of contact, and each of the two osculation ratios $O_{OE}$, $O_{OI}$ of the first row C1 of rolling elements 13 has a value different than the value of the corresponding osculation ratios $O_{IE}$, $O_{II}$, respectively, of the second row C2 of rolling elements 13, as discussed in greater detail below.

The inner raceways 111, 112 are preferably formed outside or externally of the inner ring 11, while the outer raceways 121, 122 are preferably formed directly on an inner surface 123 of the outer ring 12 which, in the example of embodiment illustrated, is also provided with an outer flange 124 for anchoring the assembly 10 to a vehicle (not shown). The inner ring 11 is preferably a flanged ring configured for attaching the wheel hub assembly 10 to a wheel (not shown). Most preferably, the ring 11 includes a flange 14 extending generally transversely to the axis A of rotation, a spindle 15 extending generally along the axis A of rotation and made of the same material as the flange 14 (i.e., the flange and spindle are integrally formed), and an inner ring 16 mounted on the spindle 15, which is axially retained or "blocked" by a rolled edge 17.

The flange 14 and the ring 16 define, for the assembly 10, the so-called "outboard side" and, respectively, the "inboard side", and the inner raceway 111 of the row C1 is formed directly on an outer surface 113 of the spindle 15 in the vicinity of the flange 14, while the inner raceway 112 of the row C2 is formed directly on the ring 16. Alternatively, according to a form of embodiment that is not illustrated, the inner raceway 111 of row C1 can also be formed directly on a respective ring in an intermediate position between the flange 14 and the ring 16 and axially blocked by the flange 14 and ring 16.

As discussed above, the raceways 111, 112, 121, 122 have respective osculation ratios $O_{xy}$ which are defined as the ratio between the radius of curvature r of the raceways 111, 112, 121, 122 and the associated one of the first and second outside diameters Φ1, Φ2 of the balls 13 of each row C1, C2. Specifically, the following osculation ratios are obtained:

$O_{OE}$: the ratio between the radius of curvature of the first outer raceway 121, outboard side, and the first outside diameter Φ1;

$O_{IE}$: the ratio between the radius of curvature of the second outer raceway 122, inboard side, and the second outside diameter Φ2;

$O_{OI}$: the ratio between the radius of curvature of the first inner raceway 111, outboard side, and the first outside diameter Φ1; and $O_{II}$: the ratio between the radius of curvature of the second inner raceway 112, inboard side, and the second outside diameter χ2.

In the exemplary embodiment illustrated, in order to reduce slippage between the balls 13 and the associated raceways 111, 112, 121 and 122, i.e., reducing the friction between rolling elements and raceways and, thereby also reducing a possible source of dissipation of energy or for the purpose of reducing consumption and pollutant emissions, in the wheel hub assembly 10, the osculation ratios $O_{OE}$ and $O_{OI}$ of the first row C1 of rolling elements 13 are different from the respective osculation ratios $O_{IE}$ and $O_{II}$ of the second row C2 of rolling elements 13, as mentioned above. The best performance in terms of friction reduction is obtained when the wheel hub assembly 10 is made according to any one of the following geometrical conditions:

1) $O_{OE} > O_{IE}$; or
2) $O_{OI} > O_{II}$; or
3) $O_{OE} > O_{IE}$ and $O_{OI} > O_{II}$.

In particular, it was found that the optimum conditions in terms of friction reduction are obtained when the wheel hub assembly 10 is made according to any one of the following geometrical conditions:

1) $O_{OE} > 1.004\ O_{IE}$; or
2) $O_{OI} > 1.004\ O_{II}$; or
3) $O_{OE} > 1.004\ O_{IE}$ and $O_{OI} > 1.004\ O_{II}$.

The different osculation ratios of the outboard side compared with the inboard side can be attained either by varying the radii of curvature of the associated raceways 111, 121 of the outboard side compared with the radii of curvature of raceways 112, 122 of the inboard side, or by varying the outside diameters Φ1, Φ2 of the balls 13.

Figure 3:
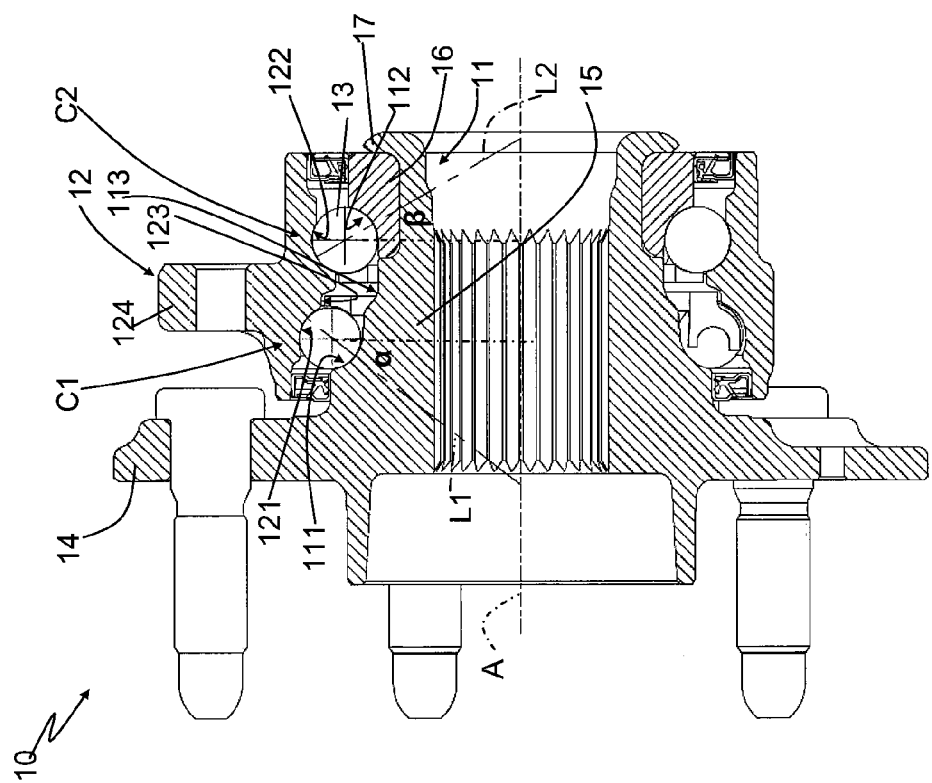
FIG. 3 illustrates, in cross section, a second preferred embodiment of a wheel hub assembly with two rows of rolling elements of FIG. 1.

In other words, the different osculation ratios of the outboard side compared with the inboard side can be obtained by making a wheel hub assembly 10', as alternatively illustrated in FIG. 3, in which the first outside diameters Φ1 of the balls 13 of the first row C1 do not have the same dimensions as the dimensions of the second outside diameters Φ2 of the balls 13 of the second row C2 of rolling elements 13, as in the exemplary embodiment described above, but in which the first outside diameters Φ1 of the balls 13 of the first row C1 have a value lesser than the value of the second outside diameters Φ2 of the balls 13 of the second row C2.

The reduction of the outside diameters Φ1 of the balls 13 entails, with the same dynamic and structural conditions described above, a reduction of the tangential velocity between balls 13 and raceways and, therefore, a reduction of friction.

In addition to the beneficial effects in terms of reduction of the friction between rolling elements and raceways as described above as an effect of the osculation ratios. For the same reduction purposes, the wheel hub assembly 10 described above, just like the wheel hub assembly 10' with balls 13 of different outside diameters, also has magnitudes of the angles α, β of contact that differ from one another and, in particular, the angle α of contact of the row C1 has a greater magnitude than the magnitude of the angle β of contact of the row C2.

Figure 2:
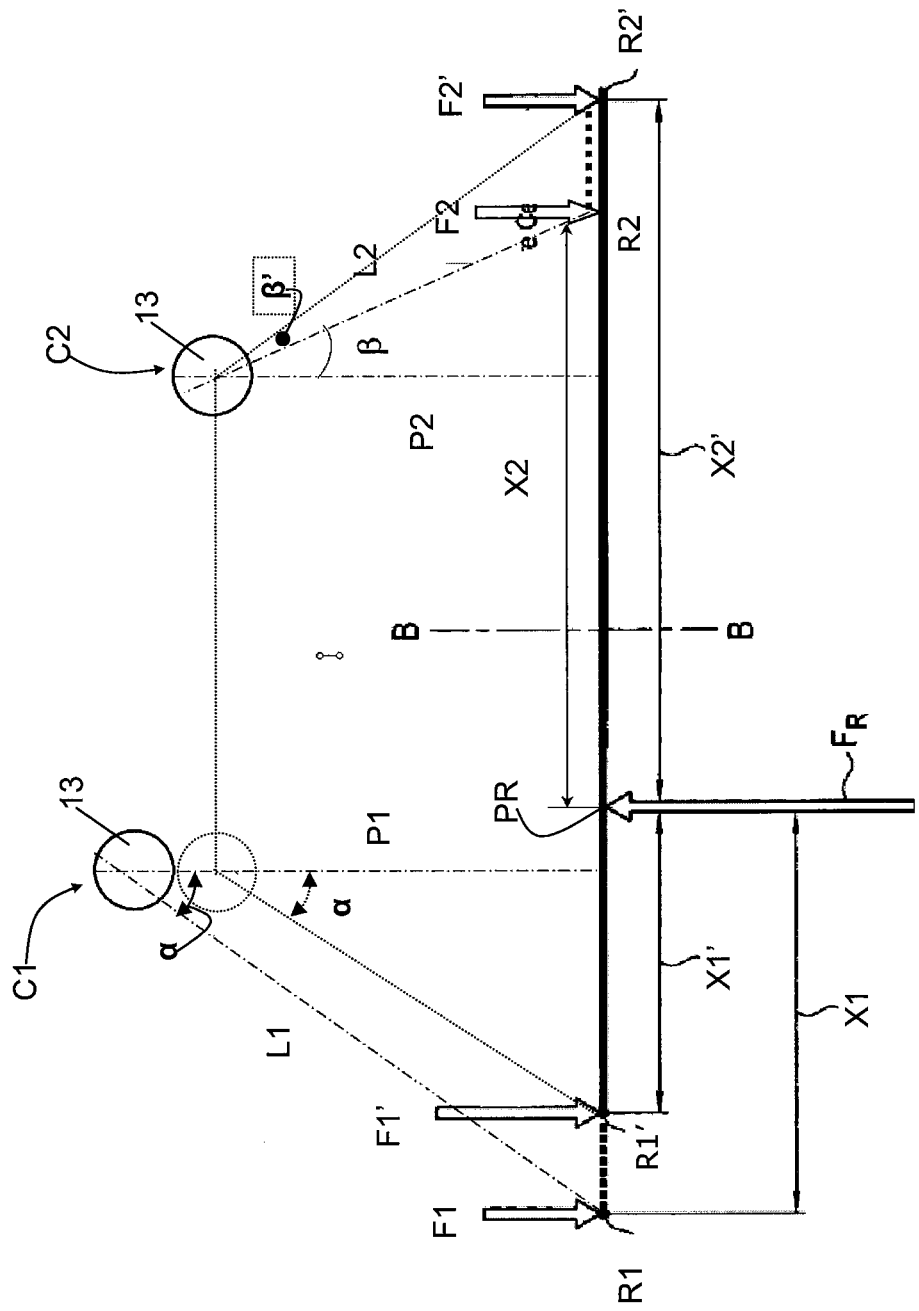
FIG. 2 is a schematic diagram of the distribution of the loads of the wheel hub assembly in FIG. 1.

FIG. 2 provides a schematic illustration of the load diagram of the wheel hub assembly 10 of the present invention in the case in which it is subjected to a wheel load FR applied at a pressure center PR arranged along the axis A of rotation. The first and second rows C1, C2 of rolling elements 13 of the wheel hub assembly 10, when subjected to the wheel load FR, react with respective reaction forces F1, F2, respectively, which are applied at the respective reaction centers R1, R2, identified along the axis A of intersection of the associated lines L1, L2 of force with the axis A, and are at axial distances X1, X2 respectively from the pressure center PR. In particular, it has been found that the optimum conditions in terms of reduction of friction are obtained when the values of the trigonometric tangents of the two angles α, β of contact are related by the following equation:

$$tg\beta = tg\alpha * \left[ \frac{X2 + X1}{X1} - \frac{X2}{X1} * K \right]$$

where:

$$K = \frac{P1}{P2}$$

With reference to FIG. 2, if the wheel hub assembly is symmetrical, i.e. with k equal to 1, and if the angles α, β of contact have the same magnitude, the reaction forces, indicated in this case by F1', F2' would be applied in respective reaction centers R1', R2' at axial distances X1', X2' respectively from the pressure center PR.

Considering the load diagram of the symmetrical wheel hub assembly 10 (i.e., when K=1), but with different amplitudes of the angles α, β of contact, i.e. with the amplitude of the angle β smaller than the magnitude of the angle α and smaller than the magnitude of the angle β', and comparing it with the load diagram of a symmetrical wheel hub assembly and with the same magnitudes of the angles α, β' of contact, the reaction center R2 of the reaction force F2 is displaced to an axial distance X2 that is less than the distance X2' with a consequent increase in the intensity of the reaction force F2. However, the reduction of the magnitude of the angle β of contact gives rise, at kinematic level, to a reduction in the revolution speed of the balls 13 around the axis A with a consequent reduction of the friction between balls 13 and raceways 112, 122.

On the other hand, when the wheel hub assembly 10 is asymmetrical, i.e., k is greater than one, and the angles α, β of contact have different amplitudes, the reaction center R1 of the reaction force F1 will be displaced, compared with the previous case of a symmetrical wheel hub assembly, to an axial distance X1 greater than the distance X1' with a consequent decrease in the intensity of the reaction force F2 itself and a better distribution of the reaction forces F1, F2 without any substantial variation of the speed of revolution of the balls 13 of the row C1 around the axis A. Thus, in an asymmetric wheel hub assembly 10, as well as benefitting from greater rigidity, there is also the benefit of better distribution of the forces, thereby allowing the balls 13 of each row C1, C2 to work under better loading conditions and with less friction between the raceways and the balls 13 so as to reduce consumption and pollutant emissions.

It is intended that the invention not be limited to the embodiments described and illustrated here, which are to be considered as examples of embodiments of the wheel hub assembly with two rows of rolling elements and is, instead, open to further modifications as regards shapes and arrangements of parts, and constructional and assembly details. Thus, it will be appreciated by those skilled in the art that changes could be made to the embodiments described above without departing from the broad inventive concept thereof, and that this invention is intended to cover modifications within the spirit and scope of the present invention as generally defined in the appended claims.

I claim:

1. An asymmetric wheel hub assembly comprising:

first and second inner raceways disposed about a central axis of rotation, each one of the first and second inner raceways having a radius of curvature;

a first row of rolling elements disposed on the first inner raceway and having a first pitch diameter and a second row of rolling elements disposed on the second inner raceway and having a second pitch diameter, the first pitch diameter having a value different than a value of the second pitch diameter, each rolling element of the first row having a first outside diameter and each rolling element of the second row having a second outside diameter; and first and second outer raceways each having a radius of curvature, the first outer raceway being disposed generally about and axially spaced from the first inner raceway such that a first load line through the first row of rolling elements defines a first angle of contact with respect to the central axis, and the second outer raceway being disposed generally about and axially spaced from the second inner raceway such that a second load line through the second row of rolling elements defines a second angle of contact with respect to the central axis;

wherein the first row of rolling elements has an osculation ratio defined between the first outer raceway radius of curvature and the first rolling element outside diameter and another osculation ratio defined between the first inner raceway radius of curvature and the first outside diameter, the second row of rolling elements has an osculation ratio defined between the second outer raceway radius of curvature and the second rolling element outside diameter and another osculation ratio defined between the second inner raceway radius of curvature and the second outside diameter, the first angle of contact has a value different than a value of the second angle of contact, and each of the two osculation ratios of the first row of rolling elements has a value different than a value of the corresponding osculation ratio of the second row of rolling elements, and wherein the value of the osculation ratio between the radius of curvature of the first outer raceway and the first rolling element outside diameter is greater than the value of the osculation ratio between the radius of curvature of the second outer raceway and the second rolling element outside diameter.

2. The wheel hub assembly according to claim 1, wherein the osculation ratio between the radius of curvature of the first outer raceway and the first rolling element outside diameter is at least 1.004 times greater than the osculation ratio between the radius of curvature of the second outer raceway and the second rolling element outside diameter.

3. The wheel hub assembly according to claim 2, wherein the first rolling element outside diameter is either substantially equal to the second rolling element outside diameter or is smaller than the second rolling element outside diameter.

4. The wheel hub assembly according to claim 1, wherein the first angle of contact has a magnitude greater than a magnitude of the second angle of contact.

5. The wheel hub assembly according to claim 4, wherein a wheel load applied to a pressure center located along the central axis generates a first reaction force in the first row of rolling elements and a second reaction force in the second row of rolling elements, the first reaction force being applied at a first reaction center and the second reaction being applied at a second reaction center, and wherein a value of a trigonometric tangent of the first angle of contact and a value of a trigonometric tangent of the second angle of contact are related in accordance with the following equation:

$$tg\beta = tg\alpha * \left[ \frac{X2 + X1}{X1} - \frac{X2}{X1} * K \right]$$

where:

K equals P1 divided by P2;

X1 is an axial distance between the first reaction center and the pressure center;

X2 is an axial distance between the second reaction center and the pressure center;

P1 is a pitch diameter of the first row of rolling elements;

P2 is a pitch diameter of the second row of rolling elements;

α is the first angle of contact; and

β is the second angle of contact.

6. The wheel hub assembly according to claim 5, wherein the pitch diameter of the first row of rolling elements is greater than the pitch diameter of the second row of rolling elements.

7. The wheel hub assembly according to claim 5, wherein:
the pitch diameter of the first row of rolling elements is greater than the pitch diameter of the second row of rolling elements; and
the wheel hub assembly further comprises an inner ring centered about the axis and an outer ring disposed coaxially about the inner ring, the first and second inner raceways being disposed externally of the inner ring and the first and second outer raceways being disposed internally of the outer ring.

8. The wheel hub assembly according to claim 7, wherein the inner ring has a flange extending transversely to the central axis and configured for connecting the wheel hub assembly to a wheel.

9. The wheel hub assembly according to claim 8, wherein the first inner raceway is formed on the inner ring and proximal to the flange.

10. The wheel hub assembly according to claim 9, wherein the inner ring further includes an axially-extending spindle formed integrally with the flange, the first inner raceway being provided by an outer surface of the spindle.

11. The wheel hub assembly according to claim 10, wherein the inner ring further includes a ring member mounted on the spindle and providing the second inner raceway.

12. The wheel hub assembly according to claim 11, wherein the first and second outer raceways are provided by inner surfaces of the outer ring.

13. An asymmetric wheel hub assembly comprising:
first and second inner raceways disposed about a central axis of rotation, each one of the first and second inner raceways having a radius of curvature;
a first row of rolling elements disposed on the first inner raceway and having a first pitch diameter and a second row of rolling elements disposed on the second inner raceway and having a second pitch diameter, the first pitch diameter having a value different than a value of the second pitch diameter, each rolling element of the first row having a first outside diameter and each rolling element of the second row having a second outside diameter; and
first and second outer raceways each having a radius of curvature, the first outer raceway being disposed generally about and axially spaced from the first inner raceway such that a first load line through the first row of rolling elements defines a first angle of contact with respect to the central axis, and the second outer raceway being disposed generally about and axially spaced from the second inner raceway such that a second load line through the second row of rolling elements defines a second angle of contact with respect to the central axis;
wherein the first row of rolling elements has an osculation ratio defined between the first outer raceway radius of curvature and the first rolling element outside diameter and another osculation ratio defined between the first inner raceway radius of curvature and the first outside diameter, the second row of rolling elements has an osculation ratio defined between the second outer raceway radius of curvature and the second rolling element outside diameter and another osculation ratio defined between the second inner raceway radius of curvature and the second outside diameter, the first angle of contact has a value different than a value of the second angle of contact, and each of the two osculation ratios of the first row of rolling elements has a value different than a value of the corresponding osculation ratio of the second row of rolling elements, and
wherein the value of the osculation ratio between the radius of curvature of the first inner raceway and the first rolling element outside diameter is greater than the value of the osculation ratio between the radius of curvature of the second inner raceway and the second rolling element outside diameter.

14. The wheel hub assembly according to claim 13, wherein the osculation ratio between the radius of curvature of the first inner raceway and the first rolling element outside diameter is at least 1.004 times greater than the osculation ratio between the radius of curvature of the second inner raceway and the second rolling element outside diameter.

15. The wheel hub assembly according to claim 14, wherein the first rolling element outside diameter is either substantially equal to the second rolling element outside diameter or is smaller than the second rolling element outside diameter.

16. An asymmetric wheel hub assembly comprising:
a first inner raceway and a second inner raceway disposed about a central axis of rotation, the first inner raceway having a radius of curvature and the second inner raceway having a radius of curvature;
a first row of rolling elements disposed on the first inner raceway and having a first pitch diameter and a second row of rolling elements disposed on the second inner raceway and having a second pitch diameter, the first pitch diameter having a value different than a value of the second pitch diameter, each rolling element of the first row of rolling elements having a first outside diameter and each rolling element of the second row of rolling elements having a second outside diameter; and
a first outer raceway having a radius of curvature and a second outer raceway having a radius of curvature, the first outer raceway being disposed around and axially spaced from the first inner raceway such that a first load line through the first row of rolling elements defines a first angle of contact with respect to the central axis, and the second outer raceway being disposed around and axially spaced from the second inner raceway such that a second load line through the second row of rolling elements defines a second angle of contact with respect to the central axis;
wherein the first row of rolling elements has a first osculation ratio defined between the first outer raceway radius of curvature and the first rolling element outside diameter and a second osculation ratio defined between the first inner raceway radius of curvature and the first outside diameter, wherein the second row of rolling elements has a third osculation ratio defined between the second outer raceway radius of curvature and the second rolling element outside diameter and a fourth osculation ratio defined between the second inner raceway radius of curvature and the second outside diameter, wherein the first angle of contact has a value different than a value of the second angle of contact, wherein the first osculation ratio is greater than the third osculation ratio, and wherein the second osculation ratio is different than the fourth osculation ratio.

* * * * *